Figure 1:
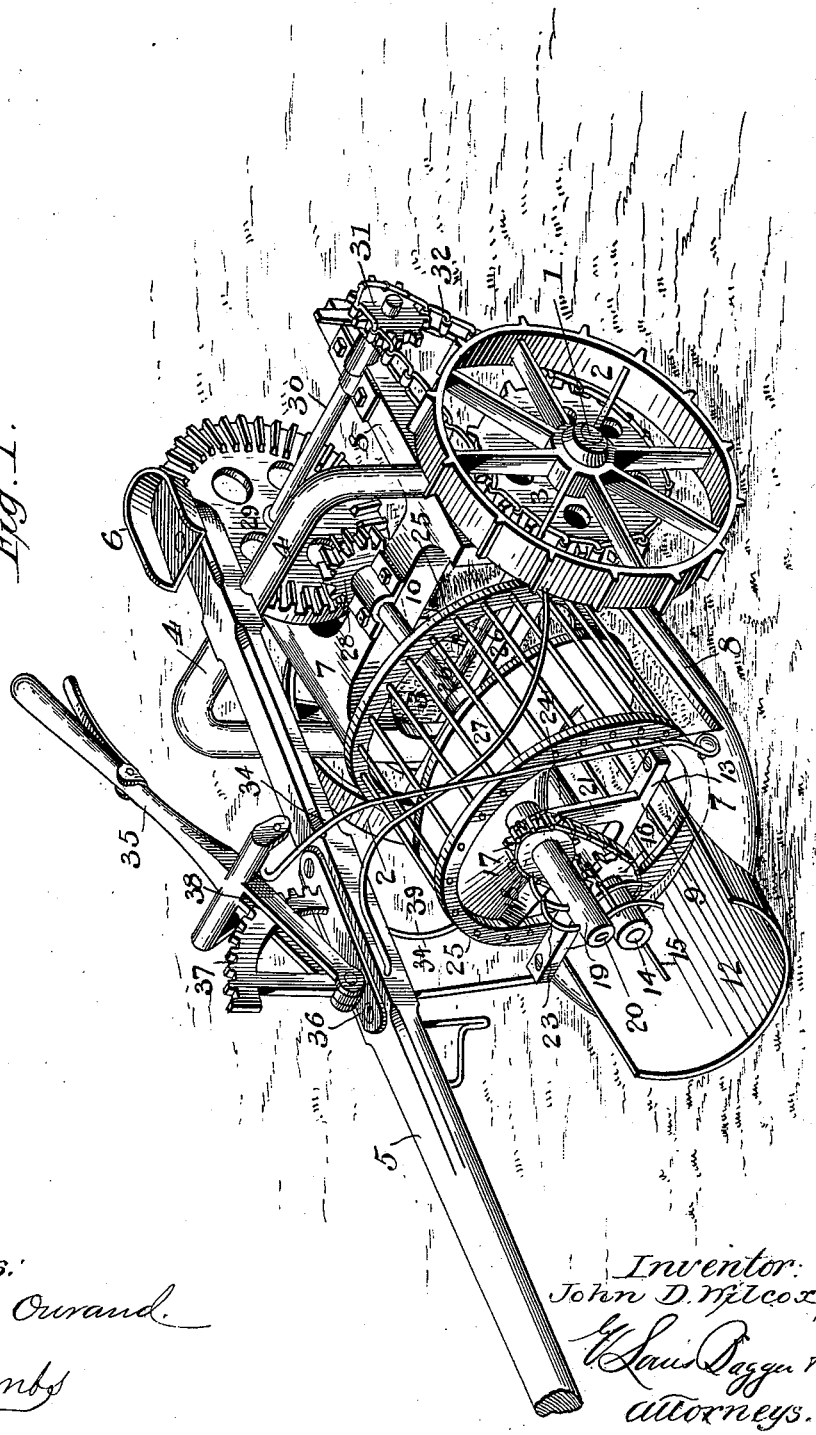

(No Model.) 2 Sheets—Sheet 1.

J. D. WILCOX.
POTATO DIGGER.

No. 560,555. Patented May 19, 1896.

Witnesses:
Franck L. Ourand
J. L. Coombs

Inventor:
John D. Wilcox
by Saul Dagger &c.
Attorneys.

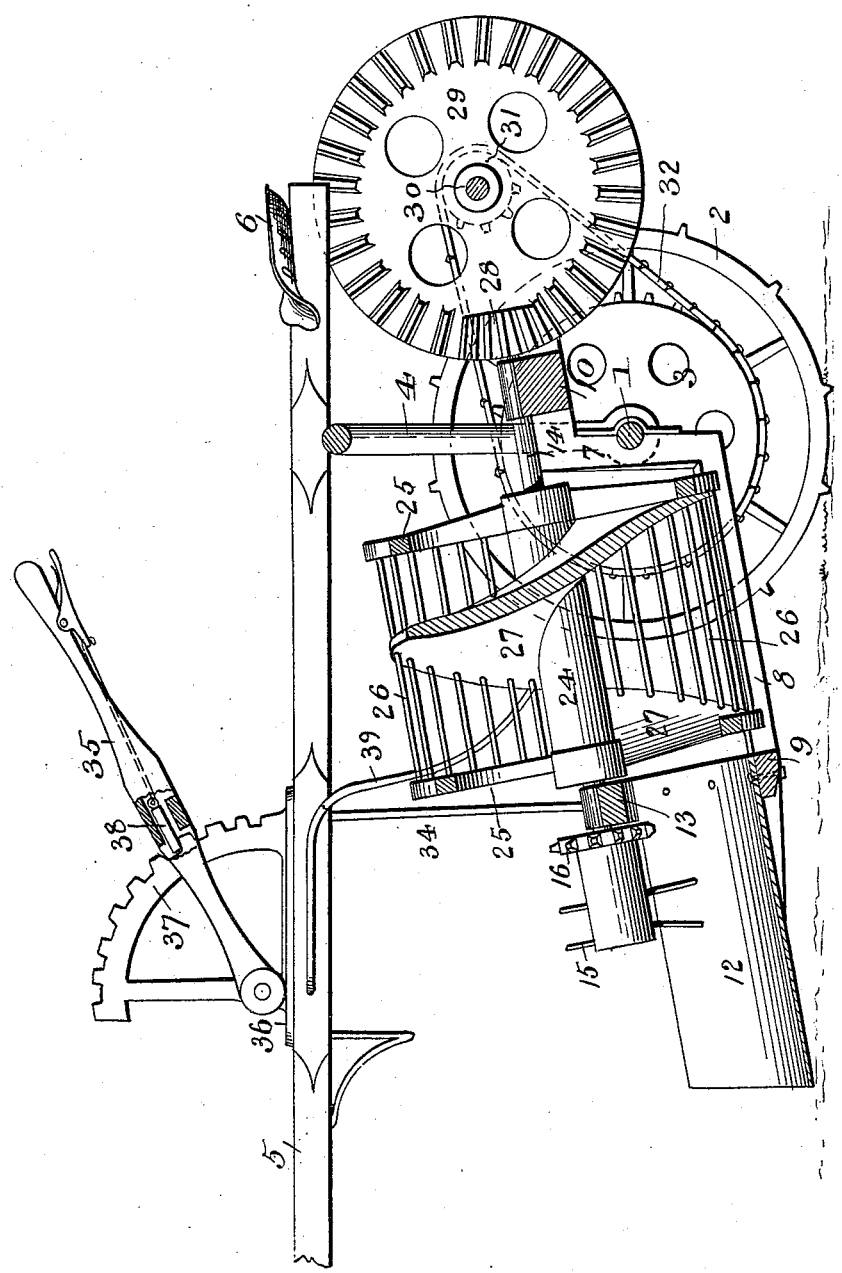

UNITED STATES PATENT OFFICE.

JOHN D. WILCOX, OF PINE CITY, MINNESOTA.

POTATO-DIGGER.

SPECIFICATION forming part of Letters Patent No. 560,555, dated May 19, 1896.

Application filed February 3, 1896. Serial No. 577,864. (No model.)

*To all whom it may concern:*

Be it known that I, JOHN D. WILCOX, a citizen of the United States, and a resident of Pine City, in the county of Pine and State of Minnesota, have invented certain new and useful Improvements in Potato-Diggers; and I do hereby declare that the following is a full, clear, and exact description of the invention, which will enable others skilled in the art to which it appertains to make and use the same, reference being had to the accompanying drawings, which form a part of this specification.

My invention relates to potato-diggers; and its object is to provide an improved construction of the same which shall possess superior advantages with respect to efficiency in operation.

The invention consists in the novel construction and combination of parts hereinafter fully described and claimed.

In the accompanying drawings, Figure 1 is a perspective view of a potato-digger constructed in accordance with my invention. Fig. 2 is a central longitudinal section of the same.

In the said drawings the reference-numeral 1 designates an axle, upon which are journaled driving-wheels 2, formed or secured to the inner sides of which are sprocket-wheels 3. Also journaled on said axle is a yoke 4, to the upper cross portion of which is secured a tongue 5, provided with a seat 6.

Secured to the axle 1 is a forwardly and rearwardly extending frame 7, consisting of two side bars 8, connected together at the front ends by a cross-bar 9 and just behind the axle by a cross-bar 10. Secured to the front of said frame is a removable scoop or shovel 12. Journaled in bearings on a cross-bar 13, above the rear end of the scoop or shovel, and in bearings on the cross-bar 10, is an inclined rotatable shaft 14, the front end of which is provided with a number of radial fingers 15. In rear of these fingers is a sprocket-wheel 16, connected by a sprocket-chain 17 with a sprocket 18, provided with a sleeve 19, journaled on a stud-shaft 20 of an arm 21, secured to the cross-bar 13. The said sleeve 19 is provided with fingers 23, similar to the fingers 15, which fingers 23 are located at one side of and above the fingers 15.

In rear of the scoop or shovel and secured to the shaft 14 is a cylindrical sleeve, consisting of a hub 24 and two circular rings 25, connected together by means of a number of rods 26, with spaces therebetween. Also secured to said hub is a screw-propeller 27, through which said rods also pass.

At the rear of the shaft 14 is a bevel-pinion 28, which meshes with a bevel cog-wheel 29 on a shaft 30, journaled to the rear ends of the side bars 8. This shaft 30 at each end is provided with a sprocket-pinion 31, connected by means of chains 32 with the sprocket-wheels 3.

The front end of the frame 7 is connected by means of rods 34 with a lever 35, pivoted to a plate 36, secured to the tongue. This plate is formed with a segment 37, provided with rack-teeth, with which engages a spring-actuated pawl 38, connected with the lever 35. The numeral 39 designates brace-rods secured to the yoke and tongue.

The operation is as follows: As the machine is drawn across the field the scoop or shovel will slip under the row of potatoes, causing the latter and the dirt to be deposited on the scoop or shovel. At the same time, by means of the sprocket wheels and pinions and chains, the shaft 14 will be rotated, when the fingers 15 will catch and throw up the vines, which in turn will be caught by the fingers 23 and be thrown to one side. The potatoes and dirt will then pass to the rotatable sieve and be carried around by the screw, the dirt and small potatoes being thrown out through the spaces between the rods of the sieve, while the large potatoes will escape at the rear of the sieve and fall into the trench made by the scoop or shovel.

The depth of penetration of the scoop or shovel can be regulated by means of the lever 35 and the machine be readily drawn across the field by a span of horses connected with the tongue as usual.

Having thus fully described my invention, what I claim is—

1. In a potato-digger, the combination with the axle, the driving and sprocket wheels, the frame, the rotatable shaft, and the connections between said shaft and sprocket-wheels, of the scoop or shovel, the radial fingers secured to said shaft, the sleeve provided with radial fingers located above and at one side of the said first-named fingers and means for rotating said sleeve; substantially as described.

2. In a potato-digger, the combination with the axle, the driving and sprocket wheels, the yoke pivoted to said axle and the tongue, of the frame secured to said axle, the shaft at the rear of said frame provided with sprocket-pinions, the chains connecting the same with the sprocket-wheels, the bevel-gear on said shaft, the inclined shaft provided with a bevel-pinion engaging with said bevel-gear, the cylindrical sieve having a hub secured to said shaft, the screw or propeller secured to said hub, the radial fingers on the front end of said inclined shaft, the sprocket-pinion also secured to said shaft, the chain, the sleeve provided with a sprocket-pinion, and with fingers located above and at one side of said aforementioned fingers, the scoop or shovel at the front of said frame, and means for raising and lowering the same; substantially as described.

In testimony that I claim the foregoing as my own I have hereunto affixed my signature in presence of two witnesses.

JOHN D. WILCOX.

Witnesses:
CHESTER R. PITT,
HORACE WILCOX.